C. BILBROUGH.
LINK HOOK.
APPLICATION FILED NOV. 25, 1918.
1,320,828.
Patented Nov. 4, 1919.
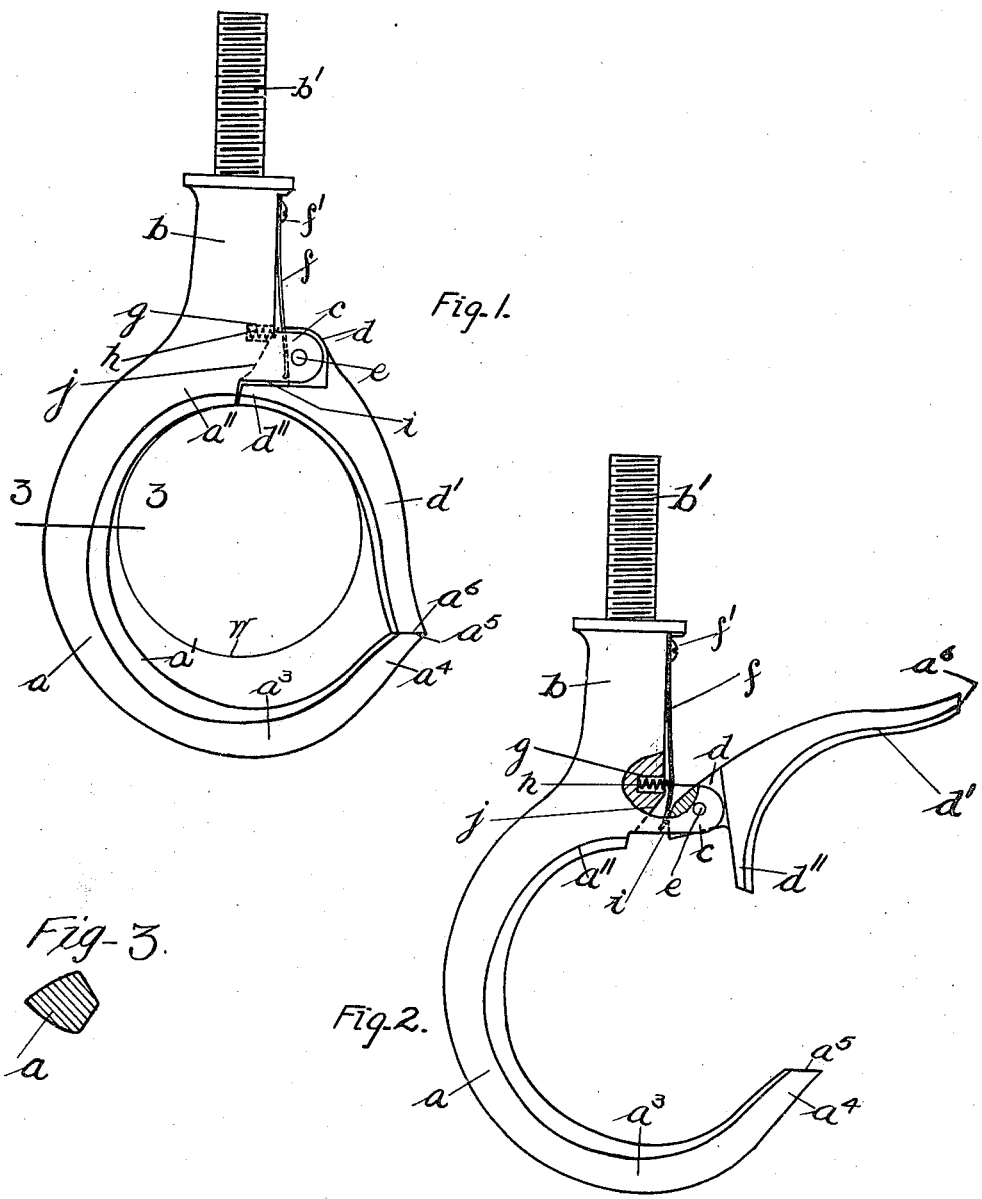

UNITED STATES PATENT OFFICE.

CHARLES BILBROUGH, OF TORONTO, ONTARIO, CANADA.

LINK-HOOK.

1,320,828.     Specification of Letters Patent.     Patented Nov. 4, 1919.

Application filed November 25, 1918. Serial No. 263,962.

*To all whom it may concern:*

Be it known that I, CHARLES BILBROUGH, of the city of Toronto, in the county of York and Province of Ontario, Dominion of Canada, have invented a certain new and useful Link-Hook; and I hereby declare that the following is a full, clear, and exact description of the same.

This invention relates to a device, which may be employed, as a substitute for an artificial hand, in the case of wrist or arm amputation, where heavy manual work is to be performed.

Artificial hands, simulating the natural hand, are now provided for cases where the arm has been amputated at or above the wrist, and some types of these artificial hands have, to a limited degree, the flexions and movements of the natural hand, but without its strength, and which, owing to the delicate and complicated character of the mechanism, are useless for heavy work.

For heavy work, various types of hooks are employed, many of which are unsatisfactory, for general use, owing to their inability to securely hold the work or implement when so employed.

To devise a means in which the strength of the hook will be combined with the gripping qualities of the hand, is the object of the present invention and this object is accomplished by the device hereinafter described and particularly pointed out in the claims.

In the drawings:

Figure 1, is a perspective view of the link-hook, with the gate in its closed position, Fig. 2, is a similar view to Fig. 1, with the gate in its open position, and Fig. 3, is a cross-sectional view on the line 3—3 Fig. 1.

Like characters of reference refer to like parts throughout the specification and drawings.

$a$ represents the hook, which may be of any suitable shape and size, but the curvature of the internal surface $a'$ is preferably a segment of an oval, with the upper part of the oval $a''$ slightly more contracted than the lower part $a^3$ to grip the implement therein, which for example may be a shovel handle or the like, and prevent its lateral movement during its use, the point of the hook $a^4$ being flared slightly outward and having a flattened or mitered surface $a^5$.

Extending upwardly from the hook $a$ is its shank $b$ having a screw threaded part $b'$ to enter a screw threaded socket in the leather sleeve fitting the amputation.

Extending laterally from the shank $b$, slightly above its junction with the hook $a$, are two lugs $c$ suitably spaced to receive the heel $d$ of the gate $d'$.

The curvature of the inner surface of the gate is a completion or continuation of that of the hook, so that when the gate is in the closed position shown in Fig. 1, it will form with the hook, a link. The heel $d$ is located at the upper extremity of the gate and fits snugly between the lugs $c$, being hinged thereto by the hinge pin $e$, passing through it and through the lugs, the free edge of the heel being slightly rounded to freely engage and disengage with the flat spring $f$, which is employed to hold the gate in its open position. The spring $f$ is located between the shank and the heel of the gate, the upper end of the spring being secured by a screw or rivet $f'$ to the shank $b$, and the lower end of the spring extending below the hinge pin $e$.

Formed transversely of the shank $b$, slightly above the lugs $c$ is a recess $g$, in which is contained a compression spring $h$, bearing against the flat spring $f$, to hold that spring securely in contact with the heel when the gate is opened.

The heel $d$ is located at the upper end of the gate, which is curved to extend inwardly beyond the heel and form a lip or locking piece $d''$. The upper surface of the lip $d''$ is flattened to engage the flattened surface $i$ on the hook at the base of the shank and on the lugs $c$, this flattened surface $i$ being countersunk to receive the lip $d''$, until its curved surface is in the same curvilinear plane, as that of the hook. This arrangement of the lip $d''$ forms, with the shank, a lock which when engaged by an implement such as that shown in a full circular line $w$ in Fig. 1, prevents the gate swinging to the open position shown in Fig. 2, the pressure of the implement handle upon the lip, when entering, the hook automatically closing the gate into the position shown in Fig. 1, and then securely holding the gate in its closed position, so long as the pressure is continued thereon.

To provide a proper seat for the implement handle when the pressure is thereon, the inner surface of the hook and gate is formed with a V-shaped bevel as shown in Fig. 3. To obtain the maximum strength of the parts in their closed position, the face of the shank between the lugs $c$ is mitered as at $j$, against which the heel $d$ of the gate is seated when in its closed position, the points of the hook and gate being also mitered, as shown as $a^5$ and $a^6$, so that they will engage when the gate is closed, the purpose of these engagements being to resist the inward movement of the gate when the strain of the implement is thereon.

When the device is to be used for lifting purposes only, the gate can be opened and the hook can be employed as an ordinary hook.

Having thus fully described my invention, what I claim as new and desire to secure by Letters Patent is:

1. A hook, the internal surface of which is preferably the segment of an oval with the upper part of the oval slightly more contracted than the lower part, a screw threaded shank extending from the hook, said hook having a flattened surface at its base of the shank, two lugs extending laterally from the shank slightly above its junction with the hook, a gate, the curvature of the inner surface of which is a completion of the hook, a heel for the gate fitting between said lugs and hinged thereto, the free edge of the heel being slightly rounded, a lip for the gate extending beyond the heel and having its surface flattened to engage with the flattened surface of the shank and form therewith a lock so that when the lip is engaged by the implement contained within the hook the gate will be prevented from swinging to open position, the free ends of the gate and hook being mitered to engage when the gate is in its closed position, a flat spring secured to the shank and engaging the heel of the gate, a recess formed transversely in the shank above the lugs, and a compression spring contained in said recess bearing against the flat spring.

2. A hook having its internal surface of a segmental oval shape, a shank for the hook having two laterally extending spaced lugs, a gate, the curvature of the inner surface of which is a completion of that of the hook, a heel for the gate fitting between said lugs and hinged thereto, a flat spring secured at one end to the shank and at the other end engaging the heel of the gate, and a lip for the gate curved inwardly beyond the heel and engaging a countersunk flattened surface in the hook at the base of the shank, and forming therewith a lock which when engaged by the implement within the hook prevents the gate swinging to open position.

3. A hook having its internal surface of a segmental oval shape, a shank for the hook having two laterally extending spaced lugs, a gate, the curvature of the inner surface of which is a completion of that of the hook, a heel for the gate fitting between said lugs and hinged thereto, a flat spring secured at one end to the shank and at the other end engaging the heel of the gate, a lip for the gate curved inwardly beyond the heel and engaging a countersunk flattened surface in the hook at the base of the shank, and forming therewith a lock which when engaged by the implement within the hook prevents the gate swinging to open position, a recess in the shank and a compression spring therein, engaging with the flat spring to hold it against the heel of the gate.

4. A hook having its internal surface of a segmental oval shape, a shank for the hook having two laterally extending spaced lugs, a gate, the curvature of the inner surface of which is a completion of that of the hook, a heel for the gate fitting between said lugs and hinged thereto, a flat spring secured at one end to the shank and at the other end engaging the heel of the gate, and a lip for the gate curved inwardly beyond the heel and engaging a countersunk flattened surface in the hook at the base of the shank, and forming therewith a lock which when engaged by the implement within the hook prevents the gate swinging to open position, the inner surface of the hook and gate being formed with a V-shaped bevel.

Toronto, November 19th, 1918.

CHARLES BILBROUGH.

Signed in the presence of—
Chas. H. Riches,
W. J. Gilchrist.